Oct. 29, 1935. J. W. WATSON 2,019,441
INTERLEAF OR SPACER
Filed Feb. 1, 1934 2 Sheets-Sheet 1
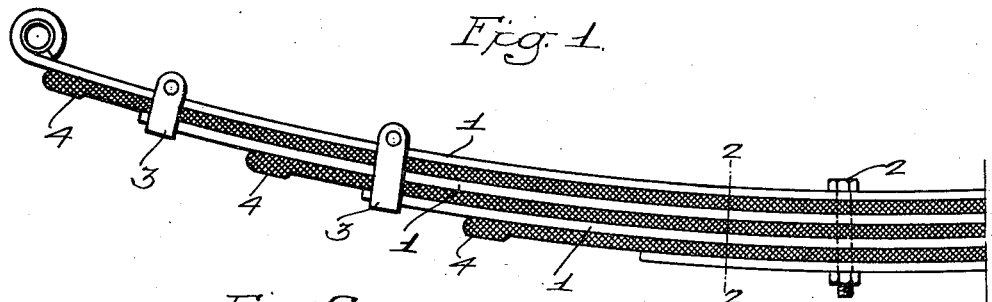
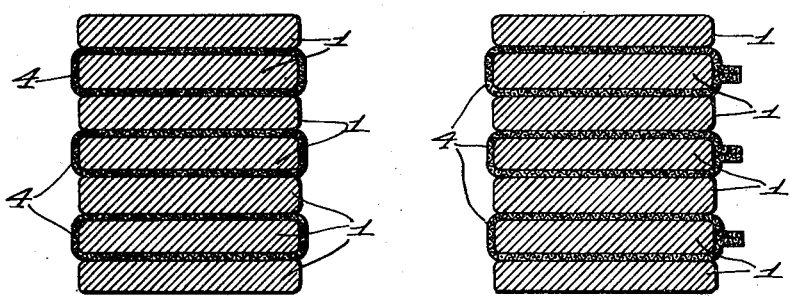
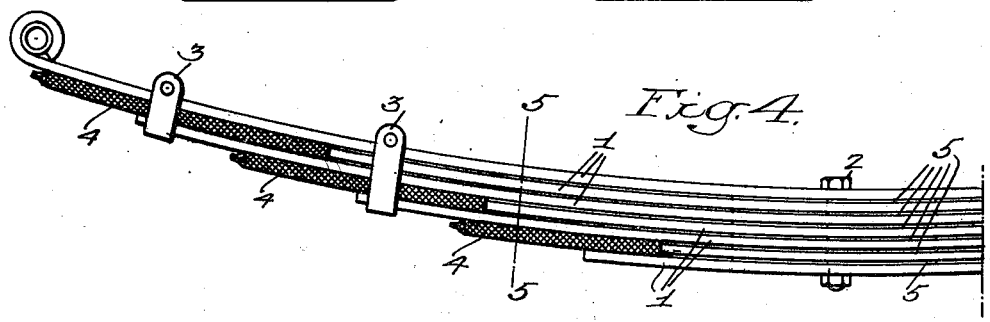
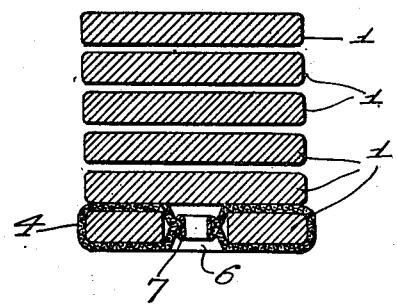
Inventor:
John W. Watson
by his Attorneys
Howson & Howson Oct. 29, 1935.   J. W. WATSON   2,019,441
INTERLEAF OR SPACER
Filed Feb. 1, 1934   2 Sheets-Sheet 2
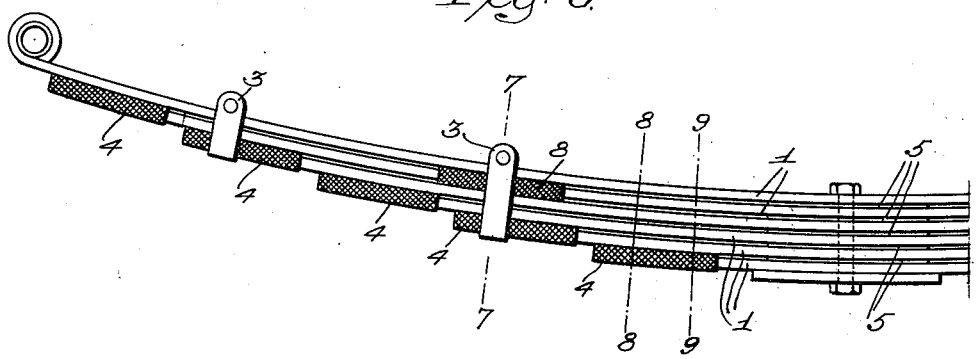
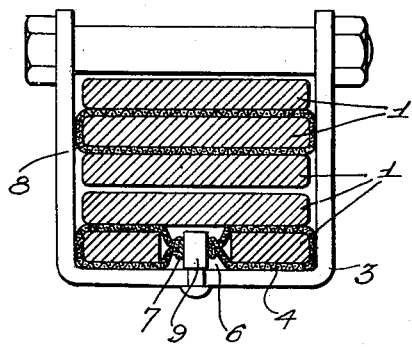 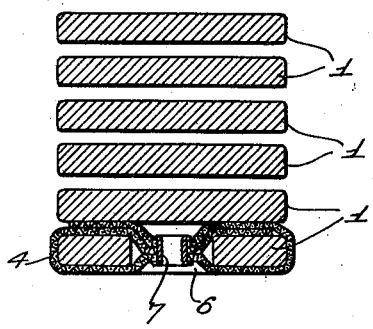
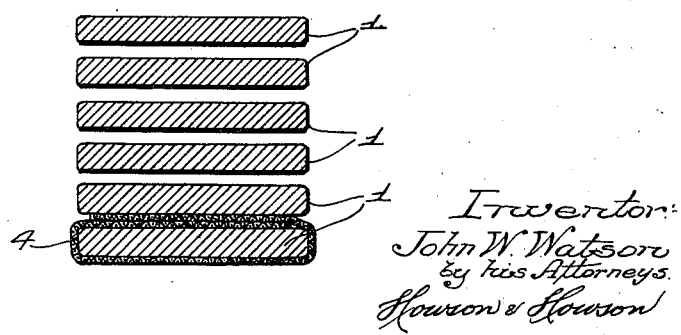

Patented Oct. 29, 1935

2,019,441

UNITED STATES PATENT OFFICE 2,019,441

INTERLEAF OR SPACER

John Warren Watson, Wayne, Pa., assignor to John Warren Watson Company, Philadelphia, Pa., a corporation of Pennsylvania Application February 1, 1934, Serial No. 709,379

4 Claims. (Cl. 267—47)

This invention relates to spacing devices adapted to control or govern the quality of friction between two members during relative movement between them, and in particular to interleaves of novel construction for multiple leaf springs, such, for example, as those used for supporting the bodies of motor cars, railway cars and other vehicles. While the invention is described and illustrated with particular reference to use in connection with multiple leaf springs, certain features thereof may be advantageously employed for spacing, or governing friction between, a numberless variety of other members during relative sliding or other motion between them.

A particular object of the invention is to reduce the static or starting coefficient of friction between relatively movable spring leaves or other members which are subject to relative movement and, particularly again, where such relative movements are of an oscillating or reciprocal nature, or, in other words, are of a reversing nature. The purpose of thus reducing the static or starting coefficient of friction between such members is to prevent them from relative adherence when movement between them is started after they have been permitted to come to rest, or from spasmodic relative adherence during relative movement between them.

Ordinarily a multiple leaf spring, because of the normally high static coefficient of friction between the leaves, is of substantially no value as a spring until the force tending to cause the spring to yield has reached a sufficient magnitude to break loose the static friction which resists the relative movement between the member leaves. By reducing the static coefficient of friction, in the manner herein described, even a very small force will be sufficient to cause the leaves to relatively slide and hence permit the spring as a whole to yield.

Furthermore, with the static coefficient of friction reduced to the extent provided by the invention, there can be no sticking or grabbing between members subject to relative movement, and, therefore, there can be no spasmodic action in their relative movement and hence there can be no vibrations set up which would manifest themselves in squeaks or noises.

Another very particular object of the invention is to provide a lubricant-bearing spring interleaf or spacer which cannot slip and become displaced, laterally, from between the spring leaves. This is accomplished in the present invention by the simple form and application of the interleaves or spacers as here illustrated and hereinafter described.

Another object of the invention is to provide interleaves or spacers, for multiple leaf springs or other devices or structures having members subject to relative movement, which spacers are not costly to manufacture and which will, therefore, satisfactorily meet the demand for an article of this nature.

To accomplish the above and other desired advantages in structures such as multiple leaf springs, the interleaves or spacers are preferably constructed of fabricated fibrous material carrying a lubricant, and are formed to surround or encase a member such as a leaf of a multiple leaf spring. This type of spacer, which may be designated as a boot, sleeve or stocking, being formed to fit nicely around the leaf, effectively prevents any lateral displacement thereof with relation to the leaf. Due also to the nice fitting construction of the interleaves or spacers, the tendency to longitudinal displacement is practically offset, but mechanical fastening means are preferably also provided to preclude any possibility of longitudinal displacement. The boots, sleeves or stockings may be formed in several alternate manners, as will hereinafter appear, and may be assembled with the relatively movable members, as the leaves of a multiple leaf spring, in a variety of ways. Preferably, in a multiple leaf spring or other structure having members subject to relative movement, the stockings or spacers are placed with respect to the structure in such manner as to preclude any possibility of contact between the leaves or members throughout their entire overlying length. In one example, as illustrated and herein later described, this is accomplished by stockings running between the leaves for the full length of their respective super-imposed areas. In other examples, herein, this is accomplished by sleeves placed merely at the ends with other spacing members placed at the center of the respective super-imposed leaf areas.

Preferably, the boots or stockings are made of fibrous material such as cotton which may be woven in tubular form of a dimension to nicely fit around any particular width and thickness of spring leaf, or the stockings may be constructed of flat material sewed or otherwise fastened together along one or both edges, or these stockings may be formed by overlapping or bandaging flat material which is held in place, and in stocking form, by other means as here illustrated and later more particularly described.

Referring to the drawings,

Fig. 1 is a partial side elevational view of a multiple leaf spring with a preferred form of the invention employed therewith.

Fig. 2 is a sectional view taken along line 2—2 of Fig. 1.

Fig. 3 is a sectional view similar to that of Fig. 2, illustrating an alternative construction of the boots or sleeves.

Fig. 4 is a partial side elevational view of a multiple leaf spring with a modified form of the invention employed therein.

Fig. 5 is a sectional view taken along line 5—5 of Fig. 4.

Fig. 6 is a partial side elevational view of a multiple leaf spring illustrating the application of a further modification of the invention.

Fig. 7 is a sectional view taken along line 7—7 of Fig. 6.

Fig. 8 is a sectional view taken along a line such as 8—8 of Fig. 6, illustrating an alternative construction of the boots or sleeves.

Fig. 9 is a sectional view taken along a line such as 9—9 of Fig. 6, illustrating a different view of the alternative boot construction shown in Fig. 8.

Referring specifically to Fig. 1 of the drawings, there is shown a conventional leaf spring embodying in this case, seven leaves 1 provided with the customary center bolt 2 and customary alignment clips 3. It will be noted that the sleeves or stockings 4 are applied only to alternate leaves in the multiple leaf structure. This arrangement, however, as will be readily understood, provides the desired interleaf spacing between consecutive leaves, and also because the sleeves or stockings, as before mentioned, fit completely around the leaves on which they are mounted, it is impossible for them to be displaced laterally of the spring structure. Fig. 2 which is a cross section along line 2—2 of Fig. 1 makes this latter point very clear. In the embodiment of the invention shown in Fig. 1 the sleeves 4 cover the alternate leaves from end to end. Thus, they cannot become displaced longitudinally of the spring as they are held by center bolt 2 which passes through an aperture in each side of each sleeve. Further, the sleeves will be held against longitudinal displacement when the spring is pinched by the customary U-bolts when fastened to the vehicle axle. If preferred, for ease of installation, should the sleeves be particularly neat fitting, the interleaves, in this embodiment of the invention, may be made in halves, each half running in only up to the center bolt, in other words, far enough in to lie directly within the pinch of the axle U-bolts. In the embodiment shown in Fig. 1, the ends of the sleeves are finished off by folding the sleeve inside of itself and tucking this folded portion under the under-side of the leaf which has been encased.

Fig. 3 shows an alternative construction of the boots or sleeves wherein instead of being woven or otherwise constructed in tubular form as shown in Fig. 2, the sleeves are made of flat stock, folded around the leaf and stitched, clipped or otherwise fastened along the edges. Obviously also, these boots may be formed by separate pieces of flat stock, stitched, clipped or otherwise fastened along two edges, one on either edge of the leaf.

Fig. 4 shows the same conventional multiple leaf spring structure as that shown in Fig. 1, but, in this modified form of the invention, the sleeves or stockings are made shorter and encase the alternate leaves only sufficiently at their ends to provide the necessary spacing of the consecutive leaves and to provide for their support and lubrication. This form may be preferred in order to save material and cost. When these shorter sleeves are used, it is preferable also to use some form of adequate spacers 5 between consecutive leaves at their centers. These latter spacers are preferably made long enough to come definitely under the grip of the axle U-bolts. These latter spacers may be made of any suitable material. It will be readily understood that with a spring fitted with these end-sleeves and with the center spacers as shown there will be no interleaf contact along the spring between these spaced points to set up static grip or squeaks. These shorter stockings or sleeves may, of course, be made of any length desired, even to encasing the spring leaf right up to the center spacer.

It will be noted in this figure that the ends of the sleeves are finished off with an alternative treatment such as by stitching, clipping or other suitable fastening for closing the end or for keeping the edges from ravelling or for providing whatever appearance may be desired.

Fig. 5 which is a section along line 5—5 Fig. 4 illustrates a preferred method of holding these shorter sleeves against longitudinal displacement. The spring leaf is provided with a suitable hole 6 immediately adjacent its end and the two sides of the sleeve are clamped together through this hole by means of stitching, riveting or eyeletting, etc. In the embodiment shown an eyelet 7 is used.

Fig. 6 shows a further modification wherein the sleeves or stockings 4 are still shorter and are mounted on consecutive leaf ends instead of on alternate leaf ends. This arrangement preferably would also require spacers 5 between the leaves at their center and in the case of springs of fair length it might also be found desirable to place another section of sleeve midway between the end sleeve and the center spacer as at 8 in order to maintain these longer leaves out of rubbing contact with one another. In this embodiment the end-sleeves are shown without any particular end treatment, simply left open.

The cross sectional view shown in Fig. 7 which is along line 7—7 Fig. 6 illustrates a preferred method of holding in place the alignment clip 3. This clip is provided with a center stud 9 which more or less loosely fits up into the hole in the eyelet 7. The short sleeve 8 is held against longitudinal displacement by means of the clamping action against its edges by the alignment clip 3.

Fig. 8 is a cross sectional view along a line such as 8—8 Fig. 6 showing an alternative method of constructing a sleeve wherein a flat piece of material is wrapped or bandaged around the leaf. This construction would permit a selvage along the two exposed edges of the sleeve to prevent ravelling.

Fig. 9 is a cross sectional view along a line such as 9—9 Fig. 6 showing the same alternative sleeve construction as shown in Fig. 8, but at a point removed from the fastening hole in order to illustrate this wrapped or bandaged construction a little more simply and hence a little more clearly.

It will be understood that any of the several forms of sleeve or stocking construction here suggested may be used in connection with any of the applications of the sleeves as here suggested. Also any of the end treatments suggested may be employed in connection with any of the sleeve constructions or applications.

Regardless of the specific form of the improved interleaf or spacer, I construct them preferably of fabricated fibrous material impregnated with a substance of a character capable of reducing the static coefficient of friction, between the spring leaves or other relatively movable members, to a point sufficiently low to prevent grab or spasmodic action. The fibrous material used may be any material suitable for the purpose such as cotton which is woven to the particular form desired. Likewise, the substance which is carried by the fibrous material or with which the fibrous material is impregnated may be any suitable lubricant such as oil, grease, graphite, or soap. I prefer to use the insoluble soaps of the fatty acids, by which term is included, for example, the alkaline earth and heavy metal salts of the various animal, fish and vegetable soap radicals. The calcium, magnesium, strontium, barium, and zinc soaps of stearic, oleic, and palmitic acids or mixtures of these acids give excellent results. Calcium stearate is especially satisfactory for use and it may be used pure or with adulterations of fatty acids, waxes and/or other soaps or substances.

Preferably, the fabricated fibrous material such as woven cotton fabric is thoroughly impregnated with the lubricant. This impregnation may be accomplished by heating the fibrous material to exhaust the moisture, subjecting it to vacuum to exhaust the air, and thereafter bringing the lubricant in fluid condition into contact with the fibrous material while still under vacuum. The vacuum is then broken and the interstices of the fibrous material will be filled with the lubricant. Compressed air may be employed to augment atmospheric pressure if desired. With the use of the insoluble soaps of the fatty acids, it is desirable to incorporate them in a solvent in order to render them in a fluid condition for the purposes of impregnation. Stearic acid is a suitable solvent for many such compounds and may be employed in a wide range of proportions to provide a suitable solution which at elevated temperatures may be advantageously used to impregnate the fibrous material in any conventional manner. The insoluble soaps of the fatty acids when used furnish a lubricating material which is solid, and, therefore, not easily removed from the fibrous material by pressure and which is also waterproof and hence cannot be removed or affected even though in contact with moisture for long periods of time.

A further advantage of the use of the insoluble soaps of the fatty acids is found in the fact that while they prevent or reduce spasmodic action between the movable members by sufficiently reducing the static coefficient of friction, these soaps, according to the proportions with which they are compounded with other materials, for effecting a solution or for the purpose of controlling their coefficients of friction, may be made to present almost any desired running frictional coefficients, high or low, which may be found desirable for governing or controlling movements between members subject to relative movement.

It will be particularly noted that the boots or sleeves herein described each carry and supply lubricant directly to all leaf surfaces, that is, each sleeve is in direct and lubricating contact with the two surfaces of the leaf on which it is mounted, and also in direct and lubricating contact with the coacting surface or surfaces of the leaf or leaves immediately adjacent to the sheathed leaf. This particular construction, therefore, supplies lubrication infallibly to every moving interleaf surface.

Although the invention has been illustrated and described herein in several embodiments with particular reference to spacing the leaves of multiple leaf springs, it will be understood that further modified forms of the invention are possible and the invention in its various forms may be used in any instance where it is desired to reduce the static coefficient of friction to the point where there can be no spasmodic action or squeaks between any members subject to relative movement.

I claim:

1. Means for reducing the static coefficient of friction between relatively movable adjacent members one of which has an opening therethrough, comprising a sleeve mounted on said one member over the opening thereof carrying at its inner and outer surfaces a lubricant so as to supply the lubricant to all of the members in contact with the surfaces of said sleeve, and means drawing the sides of said sleeve together in said opening to prevent longitudinal displacement of said sleeve.

2. Means for reducing the static coefficient of friction between consecutive leaves of a multiple leaf spring, comprising sleeves mounted at the ends only of alternate spring leaves carrying at their inner and outer surfaces a lubricant so as to supply the lubricant to all of the spring leaves where actually required, each of said sleeves extending from the end of the spring leaf on which it is mounted beyond the end of the next alternate spring leaf.

3. Means for reducing the static coefficient of friction between relatively movable adjacent members one of which has an opening therethrough, and for immobilizing an alignment device associated with said members adjacent said opening, comprising a sleeve mounted on said one member over the opening thereof carrying at its inner and outer surfaces a lubricant so as to supply the lubricant to all of the members in contact with the surfaces of said sleeve, means drawing the sides of said sleeve together in said opening to prevent longitudinal displacement of said sleeve, and means interlocking said alignment device with said last-mentioned means.

4. Means for reducing the static coefficient of friction between relatively movable adjacent members one of which has an opening therethrough, and for immobilizing an alignment device associated with said members adjacent said opening, comprising a sleeve mounted on said one member over the opening thereof carrying at its inner and outer surfaces a lubricant so as to supply the lubricant to all of the members in contact with the surfaces of said sleeve, an eyelet drawing the sides of said sleeve together in said opening to prevent longitudinal displacement of said sleeve, and a stud carried by said alignment device and extending into said eyelet.

JOHN WARREN WATSON.